Jan. 2, 1934.  O. WITTEL  1,941,522

MOTION PICTURE FILM SPOOLING SYSTEM

Filed Aug. 2, 1930

Otto Wittel,
Inventor;

By Newton M. Perrins
Attorneys

Patented Jan. 2, 1934

1,941,522

UNITED STATES PATENT OFFICE 1,941,522

MOTION PICTURE FILM SPOOLING SYSTEM

Otto Wittel, Rochester, N. Y., assignor to Eastman Kodak Company, Rochester, N. Y., a corporation of New York Application August 2, 1930. Serial No. 472,678

13 Claims. (Cl. 242—71)

My invention relates to moton picture apparatus, and particularly to a system of spooling or handling the film therefor, and has for its object the provision of a reel which can readily be fitted on a spindle without error.

My invention comprises a novel arrangement and construction for the reels and spindles of motion picture apparatus whereby the reels may be interchanged on the spindles only by reversing them, that is, they must be rotated 180° around an axis perpendicular to their normal axis of rotation. This makes certain that the reels will always be properly positioned on the spindles for supply and take-up purposes, which is particularly advantageous in handling film where two series of pictures are made on a single width of film as for example in the manner disclosed in the patent of Fritz Coors, Jr., No. 1,905,442, granted April 25, 1933.

In such a process, after a film has been passed through the apparatus using one-half of its width, the take-up and supply reels are interchanged and reversed so that the other half width of the film will be used when again passed through the apparatus. Heretofore, memory alone had to be depended upon to determine the correct position for placing the filled take-up reel upon the stationary spindle and its frequently happened that the same half of the film was passed through the working area a second time, which in cameras completely spoiled that half of the film and in projection apparatus caused considerable annoyance.

It is an object of my invention to prevent all such misfortunes due to thoughtlessness or lapse of memory by making it impossible to place the filled take-up reel upon the stationary spindle in other than the correct position.

Other objects and advantages of my invention will appear from the following description when taken in connection with the accompanying drawing in which.

Figure 1:
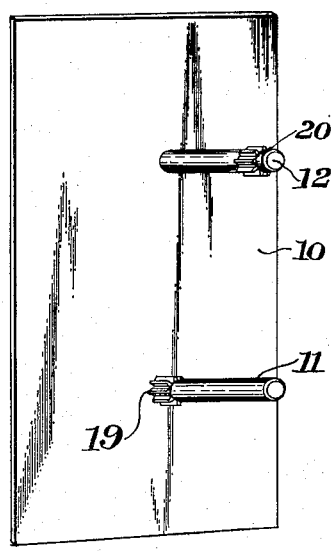
Fig. 1 is a view in perspective of the spindles mounted on a support.

Referring to the drawing a suitable support 10, which ordinarily will be a portion of a camera, has mounted thereon a spindle 11 adapted to be driven through the pulley 11' by any suitable mechanism, not shown, and a stationary spindle 12 adapted to carry a supply reel 13 having an annular hub portion 14 around which a film may be wound and circular flanges 15 and 16 which are attached to the hub 14 in any suitable manner, as is well understood in the art. The flanges 15 and 16 are provided at their centers with circular apertures 17 and 18 of the same diameter as the cylindrical bearing portions of the spindles 11 and 12. As shown the aperture 17 is provided with an even number of serrations to form in effect an internal gear which is adapted to mesh with the gear-like base portion 19 of the driven spindle 11. The aperture 18 as shown is provided with an odd number of serrations which are adapted to mesh with and pass over the gear-like enlarged portion 20 of the stationary spindle 12.

It is to be noted that the aperture 17 will mesh with and fit over the base portion 19 of the driven spindle 11, but will not mesh with or pass over the enlarged portion 20 of the stationary spindle 12, and the aperture 18 will mesh with and pass over the enlarged portion 20 in the stationary spindle 12, but will not mesh or fit on the base portion 19 of the driven spindle 11.

Figure 3:
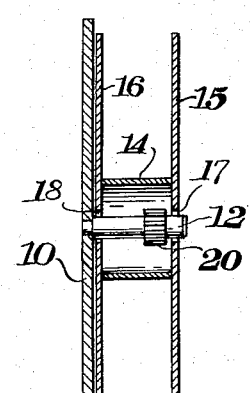
Fig. 3 is an elevation in section with the reels in position.
Figure 3:
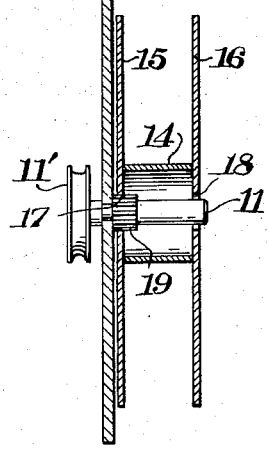
Figure 2:
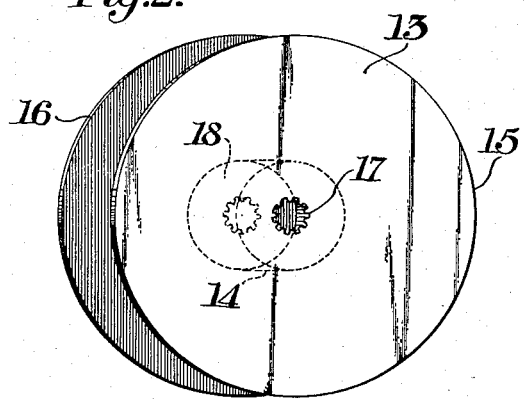
Fig. 2 is a view in perspective of a reel made in accordance with my invention.

When using a camera incorporating my invention, the reel 13 having been provided with a length of film is placed on the stationary spindle 12 with the flange 16 adjacent to the support 10, since the aperture 18 alone will pass over the enlarged portion 20. Reel 13 is now free to turn on the bearing portions of the spindle 12, for as shown in Figure 3 the enlarged portion 20 is within the hub 14 and between the flanges 15 and 16. A duplicate reel is positioned on the driven spindle 11 with the flange 15 adjacent the support 10 and the serrations of the aperture 17 are meshed with the gear-like base portion 19 which cooperates to rotate the reel 13 when the spindle 11 is rotated through the pulley 11'.

When the take-up reel on spindle 11 is filled and it is desired to interchange the reels for the reasons above stated, it is observed that the filled take-up reel must be reversed before it can be positioned on the spindle 12 to act as a supply reel, thereby preventing the same half width of film being used twice in succession.

The restrictions on the spindle have been shown as being gear-like but it is obvious that they may be given any desired dissimilar configuration, the only requirement being that the corresponding apertures in the flanges of the reel will fit over only the proper restriction.

It is to be noted that in such a process the film is always rewound and returned for finishing on the reel upon which it was supplied. The empty reel originally supplied with a camera may therefore be given a distinctive color or marking so that the user can tell by this whether or not the film has been twice passed through the apparatus.

While I have illustrated a specific form which my invention may take, in order more clearly to describe it, it is to be understood that my invention is not restricted to the details set forth, since these may be modified within the scope of the appended claims without departing from the spirit and scope of my invention. Certain of these forms are disclosed and specifically claimed in my copending application, executed concurrently herewith, Serial No. 472,679, filed August 2, 1930.

What I claim as new and desire to secure by Letters Patent of the United States is:

1. In a film spooling apparatus for motion picture apparatus the combination of two spindles having dissimilar configurations thereon, a double flanged reel having an aperture in each flange, one of said apertures being adapted to receive one of said spindles only and the other of said apertures being adapted to receive the other of said spindles only.

2. A film spooling system for motion picture apparatus comprising a double flanged reel having an aperture in each flange, said apertures being formed by dissimilar contours in said flanges, a stationary spindle having a configuration adapted to receive one of said flanges only, and a driven spindle having a configuration adapted to receive the other of said flanges only.

3. A spooling system for motion picture apparatus comprising a stationary spindle and a driven spindle, a double flanged reel provided with dissimilar apertures, means on said stationary spindle adapted to receive one of said apertures only and means on said driven spindle adapted to receive the other of said apertures only to prevent improper positioning of the reel.

4. A spooling system for motion picture apparatus comprising a stationary spindle and a driven spindle, an interchangeable reel provided with two dissimilar apertures and dissimilar means on said spindles adapted to cooperate with said apertures so that the reel can be positioned only in one position on the stationary spindle and in reversed position only on the driven spindle.

5. A film spooling system for motion picture apparatus comprising a stationary spindle having a configuration adapted to receive and support for free rotation an apertured reel in one position only and a driven spindle having a configuration adapted to receive said reel in reverse position only.

6. A spooling system for motion picture apparatus comprising an idle spindle and a driven spindle, an interchangeable hub provided with two dissimilar apertures and dissimilar means on said spindles adapted to cooperate with said apertures so that the hub can be positioned only in one position on the idle spindle and in reversed position only on the driven spindle.

7. In photographic apparatus, a reel mount having a cylindrical reel shaft with a plurality of radial lugs extending therefrom spaced on said cylindrical shaft, a film supporting member including a hub at least the end portions of which are hollow and the ends of which comprise perforated plates, one perforated plate having an aperture provided with cut out portions corresponding to the lugs extending from said cylindrical shaft and also provided with a plurality of inwardly extending lugs, corresponding in number to the plurality of spaced lugs on the shaft and of a size and shape adapted to slide between said lugs, the inner ends of the inwardly extending lugs of the perforated plate constituting a bearing member adapted to engage and rotatably support said film supporting member on said cylindrical shaft after said film supporting member has been slid over the spaced lugs on said cylindrical shaft.

8. A photographic film support for photographic apparatus having a cylindrical shaft with a plurality of spaced lugs extending from a limited area axially of said shaft, said support comprising a core at least the end portions of which are hollow, perforated flanges on the ends of the core, at least one perforation being of a configuration adapted to pass over the spaced lugs on the said shaft, said perforation including a plurality of lugs extending toward the center of the perforation complementary in shape to the shape of the spaced lugs on the shaft, the inner end of said lugs forming substantial bearing surfaces adapted to engage the cylindrical shaft.

9. A motion picture film reel adapted to be mounted on each of two cylindrical shafts provided with dissimilar radial protuberances and comprising two axially spaced flanges having dissimilar apertures, one aperture being provided with a number of radial, inwardly directed projections adapted to receive one of said shafts having a configuration complementary thereto, and the other aperture being provided with a different number of radial, inwardly directed projections adapted to receive the other of said shafts complementary thereto whereby the reel can receive one of said shafts in one position only and the other of said shafts in reverse position only, the inner ends of the projections of both apertures defining circles of equal size whereby the reel may be centered on the cylindrical portion of said shafts.

10. A motion picture film reel adapted to be mounted on each of two cylindrical shafts provided with dissimilar radial protuberances and having a hollow hub the ends of which comprise perforated plates, one plate having a perforation adapted to pass over one of said shafts and its radial protuberances but not the other of said shafts, the other plate having a perforation adapted to pass over only the other of said shafts and its radial protuberances, whereby the reel can be mounted only in one position on one of said shafts and in reversed position only on the other of said shafts, and each of said perforations having a plurality of inwardly extending radial lugs provided with curved faces adapted to engage said cylindrical shafts and furnish a substantial bearing surface therefor.

11. In a motion picture camera, a non-driven spindle for a supply reel, said spindle being provided with portions constituting bearing surfaces at both ends thereof and having intermediate of the ends a non-cylindrical portion of greater cross sectional area than the portions forming said bearing surfaces, and a driven spindle for a take-up reel provided with a non-cylindrical portion adapted to receive a take-up reel in driving relation.

12. A spooling system for a motion picture apparatus comprising two spindles each of which has portions along its length of different cross section, one portion on each spindle being non-circular, and the said non-circular portions of the two spindles being materially different, one of the spindles being a driven spindle and having its said non-circular portion at its base, whereby a reel having suitable openings in its two flanges may be positioned with one flange outwardly on one spindle only and with the other flange outwardly on the other spindle only.

13. A spooling system for a motion picture apparatus comprising an idle spindle having along its length portions of different cross section, one of said portions being non-circular and adapted to fit an irregular aperture in one flange only of a suitable reel, and a driven spindle also having along its length portions of different cross section, one of said portions being non-circular and different from the non-circular portion on the first shaft, and adapted to engage a differently shaped irregular aperture in a second flange only of such a reel.

OTTO WITTEL.